C. HILGERS.
DEVICE FOR CAPTURING INSECTS.
APPLICATION FILED AUG. 5, 1913.
1,178,157.
Patented Apr. 4, 1916.
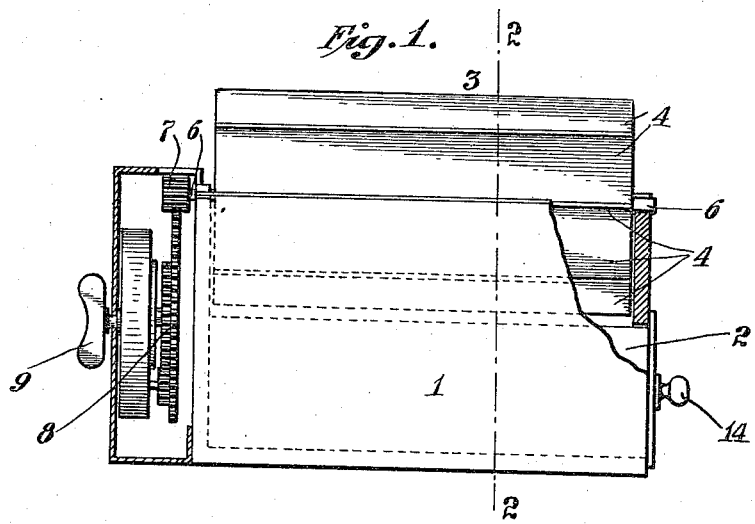
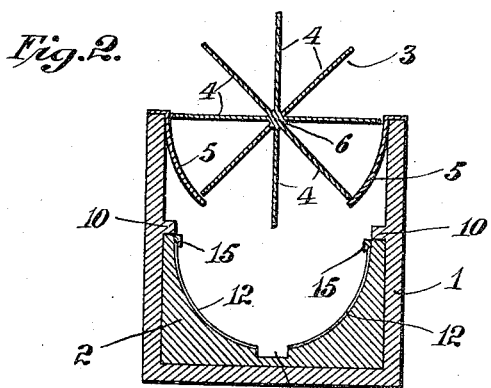
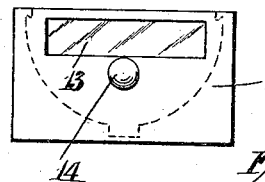
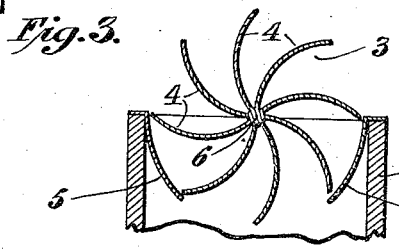
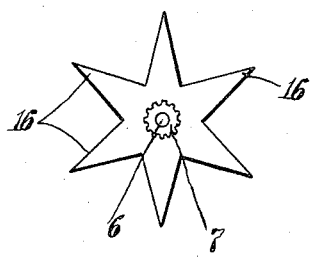
Crystal Hilgers,
Inventor:
by Henry S. Blackmore
Atty

UNITED STATES PATENT OFFICE.

CRYSTAL HILGERS, OF CHICAGO, ILLINOIS.

DEVICE FOR CAPTURING INSECTS.

1,178,157. Specification of Letters Patent. Patented Apr. 4, 1916.

Application filed August 5, 1913. Serial No. 782,752.

*To all whom it may concern:*

Be it known that I, CRYSTAL HILGERS, a citizen of the United States, residing at Chicago, in the county of Cook and State of Illinois, have invented certain new and useful Improvements in Devices for Capturing Insects, of which the following is a specification.

This invention relates to devices for capturing, securing or removing flies or other insects from rooms, apartments or other places, and has for its object the capturing and removing of flies, insects and the like, in such a manner that they may be obtained or secured without the unsightly conditions which accompany the employment of exposed sticky fly-paper or paper of the poisonous variety, which exhibit the captured and dead flies to occupants of rooms or apartments where they are employed, and to provide a means whereby the flies and insects may be captured in an automatic and progressive manner, and killed or disposed of out of sight and whereby a greater destruction among them may be accomplished in shorter time and in more perfect manner than with devices employed heretofore, and whereby the presentation or exposing of such disagreeable substances as sticky paper or injurious poisonous substances which are associated with fly papers of the poison type, which might produce deleterious effects on children or people handling or coming in contact with it, is avoided or obviated.

With these and other objects in view the present device comprises a combination of members adapted to produce the desired result, and an apparatus including the members and constructed in accordance with the invention, is shown or illustrated in the accompanying drawings, to which attention is directed, in which, Figure 1 illustrates a longitudinal plan view in part sectional. Fig. 2 is a cross-section on the lines 2—2 of Fig. 1, Fig. 3 is a cross section showing a modified form of leader, carrier, or conveyer, Fig. 4, is a front view of the drawer or receptacle for the dead or captured insects, and Fig. 5, is still another modification of the insect leading, carrying, or conveying member.

The like numerals employed represent corresponding parts in the various views.

Referring to the various views, the numeral 1 represents a box or body of the apparatus provided with the drawer 2, so situated that the insects conveyed to the interior will be captured or secured therein, and from which they can or may be removed or discharged at will by withdrawing and cleaning the same. The combination is provided with a member, 3, comprising a means for conveying or carrying insects or flies attracted thereto and resting or feeding thereon to the inner part of the apparatus, shown in the present instance as a series of wings or extensions 4, communicating with the shaft 6 and provided with the closure guides or projections 5, acting as guards to prevent the escape of insects from the trap or apparatus. The insect conveying member or leader is provided with means for moving or revolving it, such as a metallic spring-actuated mechanism shown. The shaft 6 being provided with the cog-wheel 7 which meshes with the mechanism 8 and the operation of which is actuated by the spring mechanism which is wound up by the key 9. The box or body of the apparatus 1 is provided on its interior with the guides 10 for directing and securing the drawer or receptacle 2 for the insects captured. The drawer or receptacle 2 is provided with the inverted angular device 15 for holding or securing such materials as sticky fly-paper or other material by springing the same down in and on the curved inner surface 12 of the drawer 2, when such material is employed as a means of capturing or securing the insects or flies, the drawer is also provided with the channel 11 at its bottom, which is adapted to contain kerosene or other substances which have the property of smothering or killing the insects or flies in cases where this means is considered selective to the sticky paper, or other similar securing means. The drawer or insect receptacle is also provided with a lighting means such as the glass 13 (Fig. 4), for attracting the insects down to the capturing receptacle in an attempt to escape from the same, and also with the knob 14 for withdrawing the receptacle.

In the operation of the apparatus adapted for catching or securing flies, for example, the wings or extensions 4, of the attracting and conveying member 3 are coated with a substance such as molasses and a small amount of kerosene oil is placed in the channel 11 of the drawer or receptacle 2, and the drawer closed. The spring-actuating mechanism is then wound up by the key 9, thereby causing the revolution or operation of the power-transmitting mechanism 8, imparting a rotary motion to the shaft 6 by means of its meshing wheel 7. The conveyer or carrier 3 then gradually revolves while the molasses or other insect or fly-attracting substance draws them thereto and while they are feeding they are gradually carried about and around and into the apparatus or trap, the guards 5 preventing the escape from the interior while the conveyer, carrier or feeder is traveling. As the flies are carried around and down into the apparatus the fumes of the kerosene arising from the channel 11 kill them and they accumulate in the receptacle or drawer 2, and can be withdrawn or removed from time to time as desired, and it is therefore seen that they accumulate out of sight of occupants of the room or apartment where the apparatus is employed.

Instead of employing such means as kerosene placed in the channel 11 of the apparatus ordinary sticky paper may be sprung down on the curved surface 12 of the receptacle or drawer 2 and secured by the notches of the fixing device 15 at its edges, the sticky side being upward and when the flies or insects are introduced into the apparatus they will seek to escape by way of the lighted glass-closed portion 13 of the receptacle or drawer 2 (Fig. 4) and will thus be brought in contact with the sticky surface of the paper and be caught or secured out of sight, and can be removed thereafter as desired.

In Fig. 3 is illustrated a modified form of conveyer, carrier or leader 3, including curved wings or extensions 4 which accomplish the same carrying feature, and Fig. 5 shows still another modified form of conveyer or carrier, the differing shapes and surfaces presented by each providing means selectively adapted for various insects or at various localities for exposing the attractive or feeding substance and maintaining the insects thereon until they are conveyed or carried into the apparatus or trap.

The leader, carrier, or conveyer of the star-shaped form shown in Fig. 5 provides a series or plurality of surfaces 16 which are exhibted or presented at all angles and positions during the revolution of the shaft 6 to which it is attached, and with which it revolves during the operation of the device. The surface 16 of the star-shaped rotary conveyer (Fig. 5) may be made of porous or bibulous paper, such as blotting paper, and slipped on the form or over the frame in the form shown, or a sheet may be suitably adjusted thereon by means of keys or other attachments.

It will be noted that the leader, conveyer or carrier 3 may be easily detached and removed from the apparatus by lifting the same out so that the surfaces thereof may be easily coated with substances capable of attracting flies or other insects, or upon which they may feed, and also for the purpose of cleaning the same from time to time as desired, and after which it may be replaced and adjusted at will.

Instead of the spring actuated mechanism shown as a means for moving or actuating the operation of the device, any means for moving the shaft or insect carrier may be employed, such as an electric or other motor in cases where the device is of considerable size, or any other moving means may be employed. And also any shape or form of apparatus or the members thereof may be employed, and the apparatus or its parts may be made of glass or any other suitable substance or material, so long as the combination of members of the apparatus is maintained, which comprises a movable conveyer, carrier, or leader for the insects, provided with an insect attracting, resting, or supporting means, and means for moving the same, an insect depository or receptacle communicating with the carrier, means for killing or securing the insects conveyed to the receptacle, and means for removing the secured or killed insects from the apparatus.

An apparatus of this character is adaptable or may be adapted to capturing or securing any insects to which it may be selectively constructed, such as water bugs, ants, mosquitoes, etc., as well as flies, and any selective substance may be employed as a bait or attractive material, such, for instance, as chocolate or cocoa butter, in case of water-bugs, or such substances as sugar, molasses or syrup for flies and the like. The insect conveyer or carrier of movable nature may also be of any form or character, such as the revoluble means shown in the illustration, or may constitute a moving belt or other carrying and supporting means so long as it performs the function of carrying and delivering the insects resting upon it to a point where they can be delivered to the insect depository or receptacle, and there exposed to the action of a substance capable of securing or killing them. The means whereby the killed or captured insects may be removed from time to time as desired, may also be of other character than the drawer shown and may be removed during the operation of the apparatus.

The term "radially extending" employed herein with reference to the direction and character of the insect resting, carrying and delivering member of the combination, implies and is intended to imply an insect conveyer or carrier exposed, extending, or presented in a radial direction from a revoluble support or bearing, communicating with one end, whereby the insects are slowly carried in a rotary path instead of in a moving plane direction. That is to say rotatably traveling on a fixed radially extending support of fixed character.

Traps for flies and other insects have been devised whereby the flies were carried into traps on endless traveling belts, bands, and aprons but they presented the difficulty that jarring and shaking thereof scared the flies or insects and when the insects were killed upon such belts between rollers or similar crushing devices from which belts or carriers the dead insects have to be removed by supplemental means, also where the insects have been brought into a chamber from which they of their own free will had to enter a secondary or final compartment of the trap through openings by the lure of a light or other means, and in which secondary or separate compartment the insects were killed after they came there, or were killed thereafter by removing the compartment and submerging it in water or other means. The dominating features of the present invention and advantages presented over the devices of the prior art, however, resides in the fact that in the present invention the insects are positively carried and brought into the execution chamber by the operation of the device and the execution is performed therein out of contact with the insect carrying mechanism whereby suplemental means for cleaning the same of crushed and dead insects is obviated and the chance factor that the insects will not of their own free will enter the final compartment of the trap or the execution chamber is also obviated and the desired result, namely, the capturing and killing of the insects, positively accomplished by direct and mechanical means without interfering with or obstruction of the operation of the device.

Having now described my invention, what I claim as new and desire to secure by Letters Patent is:—

1. A device for capturing and killing insects, which comprises the combination of an insect depository, means extending into the depository for depositing the insect in the depository, means separate from and independent of the insect depositing member for killing the insect in said depository, and means for removing the dead insects therefrom.

2. A device for capturing and killing insects, which comprises the combination of an insect depository, rotatable means extending into the depository for carrying and depositing insects in the depository, means separate from and independent of the insect depositing member for killing the insect in said depository, and slidable means for removing the dead insects therefrom.

3. A device for capturing and killing insects, which comprises the combination of an insect depository, rotatable means extending into the depository for carrying and depositing insects in the depository, means separate from and independent of the insect depositing member for killing the insect in said depository, a lure for attracting insects toward the killing means in said depository, and slidable means for removing the dead insects therefrom.

4. A device for capturing and killing insects, comprising the combination of an insect depository, a plurality of radially disposed carriers rotatably mounted to normally close the said depository and extend therein and therefrom and provided with means for attracting insects, means for rotating said rotatable member, means for killing insects deposited in the depository, and movable means for removing the insects therein therefrom.

In testimony whereof I affix my signature in presence of two witnesses.

CRYSTAL HILGERS.

Witnesses:
 JESSIE S. BYRNE,
 ELLA LOUISE KELLER WILLISON.

Copies of this patent may be obtained for five cents each, by addressing the "Commissioner of Patents, Washington, D. C."